United States Patent [19]
Heilig et al.

[11] Patent Number: 5,918,509
[45] Date of Patent: Jul. 6, 1999

[54] POWERSHIFT REVERSING TRANSMISSION

[75] Inventors: Eduard Heilig; Jürgen Legner; Egon Mann; Helmut Eymüller, all of Friedrichshafen, Germany

[73] Assignee: ZF Friedrichshafen AG, Friedrichshafen, Germany

[21] Appl. No.: 08/930,679

[22] PCT Filed: May 13, 1996

[86] PCT No.: PCT/EP96/02041

§ 371 Date: Oct. 2, 1997

§ 102(e) Date: Oct. 2, 1997

[87] PCT Pub. No.: WO96/36824

PCT Pub. Date: Nov. 21, 1996

[30] Foreign Application Priority Data

May 16, 1995 [DE] Germany .............................. 195 17 888

[51] Int. Cl.$^6$ .................................................. F16H 61/26
[52] U.S. Cl. .................. 74/730.1; 192/87.13; 192/91 A; 477/55
[58] Field of Search ............................... 74/730.1, 732.1, 74/335; 477/55, 130; 192/87.13, 48.8, 91 R, 91 A

[56] References Cited

U.S. PATENT DOCUMENTS

| | | | |
|---|---|---|---|
| 3,099,166 | 7/1963 | Shou | 74/730.1 X |
| 3,110,196 | 11/1963 | Hilpert et al. | 477/55 |
| 5,234,087 | 8/1993 | Jürgens et al. | 192/87.13 X |
| 5,261,517 | 11/1993 | Hering | 192/91 A |
| 5,429,005 | 7/1995 | Fukui et al. | 74/335 X |
| 5,509,860 | 4/1996 | Legner | 475/129 |

FOREIGN PATENT DOCUMENTS 327 812 A1  8/1989  European Pat. Off. .

*Primary Examiner*—Charles A. Marmor
*Assistant Examiner*—Sherry Lynn Estromsky
*Attorney, Agent, or Firm*—Davis and Bujold

[57] ABSTRACT

A powershift reversing transmission (1) having a hydrodynamic torque converter and at least two clutches (17, 18) for shifting to the forward and reverse driving directions. The clutches are designed as negative clutches. A reservoir (33), from which pressurized medium flows through an aperture (37), is provided to modulate the pressure when reversing the transmission. A throttle (39), with a variable cross section, is provided for inching. A back pressure may be applied to the clutches (17 or 18) through the throttle (39). This reversing transmission is particularly useful for driving lift trucks or as an entry unit for a multi-speed reversing transmission.

4 Claims, 2 Drawing Sheets

POWERSHIFT REVERSING TRANSMISSION

The invention concerns a powershift reversing transmission having a hydrodynamic torque converter, an input shaft, an output shaft, at least one countershaft and gearwheels which form a reversing set, and clutches with idler gearwheels which have actuating devices and can be optionally non-rotatably connected with the input shaft or countershaft for a shifting direction.

BACKGROUND OF THE INVENTION

A transmission of the kind described above is a reversing transmission as used especially in lift trucks, such as loaders. But it can also be the entry unit of a multi-speed reversing transmission as particularly used in constructions machines, such as wheel loaders, excavator loaders, etc.

Reversing transmissions of the kind mentioned have, in general, an input shaft and, as a rule, several countershafts. Clutches (so-called direction and gearshift clutches) having idler gearwheels which can optionally be non-rotatably connected with the shafts for shifting a gear and direction, are situated upon said countershafts. The power take-off is effected by a driven gear system. The number of fixed gearwheels depends on the number of gears of the transmission.

Powershift reversing transmissions of a countershaft design stand out by a series of advantages. Such transmissions are consequently used in several industrial vehicles. Said transmissions must be compact in construction and comfortable for gearshifts. For this purpose, the hydraulically actuatable clutches are mainly shifted by modulation of the actuating pressure in a manner such that a controlled load take-up results. In certain vehicles, for example, in lift trucks such as fork lift trucks or the like, other operating conditions are of special importance together with the reversing operation. To said conditions mainly belong starting off, inching and raking.

SUMMARY OF THE INVENTION

The problem, on which the invention is based, is to provide a reversing transmission which stands out by great comfort of operation and a simple design. This must not only apply to the reversing operation but also to the other operating conditions mentioned.

The problem, on which the invention is based, is solved by the fact that each clutch is actuatable by spring tension when engaging and hydraulically against spring tension when disengaging, and that a directional valve is provided for actuating the clutch which, in one shifting position, connects an annular chamber of the actuating device with a feed pipe and, in another shifting position, connects the annular chamber, via a return pipe, with a reservoir from which the pressure medium conveyed from the annular chamber to the reservoir flows out through an aperture. The clutches (reversing clutches) used for a shifting direction are negatively actuated, that is, engaged by spring tension and hydraulically disengaged. This is a requirement to make possible, in combination with a reservoir, a modulation of the clutches without an additional modulation valve being needed. Despite a very simple design, the load take-up can be controlled by pressure modulation by a respective clutch. Contrary to seat valves, no problems result in the case of different viscosities since the used aperture works relatively independently of viscosity. The control can be hydraulic or electrohydraulic, which reduces the needed expenditure. A simple start off is made possible by the hydrodynamic torque converter. The used reservoir is designed for reversing shifts. This means that it quickly absorbs, almost completely, the oil suddenly removed from the annular chamber of the actuating device when the clutch is actuated. The subsequent modulation operation obviously develops so that the driver is relieved from the pressure modulation. The time function for engaging a clutch can be adjusted by a simple variation of the aperture. When actuating the clutch, the starting point of the modulation is very quickly reached. This advantage cannot be attained with proportional valves since the positive actuation of a clutch naturally takes a certain amount of time because the clutch must first be filled. In the simplest form, the reversing transmission, according to the invention, is a transmission having a forward and a reverse gear such as used in a lift truck drive. But the transmission can also form the input of a multi-speed powershift reversing transmission such as particularly used in construction machines like wheel loaders, excavators, etc.

It is advantageous to insert in the return pipe, before the reservoir and the aperture, a directional valve by which the return pipe is permanently open during normal operation and, in a currentless state, the return pipe is connected with another reservoir for starting a braking operation. The pressure medium flows out from said reservoir through another aperture. This feature is of special advantage particularly in the case of an emergency braking. The pressure is thus modulated, during such an emergency braking, similarly to the pressure modulation during a gearshift operation even though in another pressure and time range.

Advantageous for the inching operation is a design where a connecting pipe leads from the feed pipe to the return pipe. In said connecting pipe is a throttle of variable cross section. This throttle is advantageously adjusted by an inching pedal. By actuating the inching pedal during the inching operation, it is obtained that an engaged clutch receives back pressure with pressure medium from the feed pipe, via the connecting pipe and the return pipe. This clutch can slip due to the build up of said back pressure. No separate inching valve is required for this. It is also advantageous that by virtue of this arrangement, pressurized medium from the feed pipe steadily outcrops before the throttle.

When engaging a clutch, in order to quickly reach the starting point from which a controlled load take up occurs, it is very advantageous that the reservoir has a volume substantially corresponding to the oil volume removed from the annular chamber until the discs of the clutch abut.

The reversing transmission, according to the invention, can be completed by countershafts and gearwheels and other clutches for shifting gear, the same as a driven gearwheel set, to form a multi-speed transmission.

The reversing transmission, according to the invention, is especially suited to drive a lift truck, such as a fork lift truck.

Other features, essential to the invention and the advantages resulting therefrom, are to be understood from the description that follows of an embodiment of the invention.

BRIEF DESCRIPTION OF THE DRAWING(S)

In the drawings:

FIG. 1 is a powershift reversing transmission having a hydrodynamic torque converter for driving a lift truck, seen along a longitudinal section; and FIG. 2 is the diagram of a hydraulic circuit for actuating the clutches of the reversing transmission of FIG. 1.

DESCRIPTION OF THE PREFERRED EMBODIMENT(S)

Figure 1:
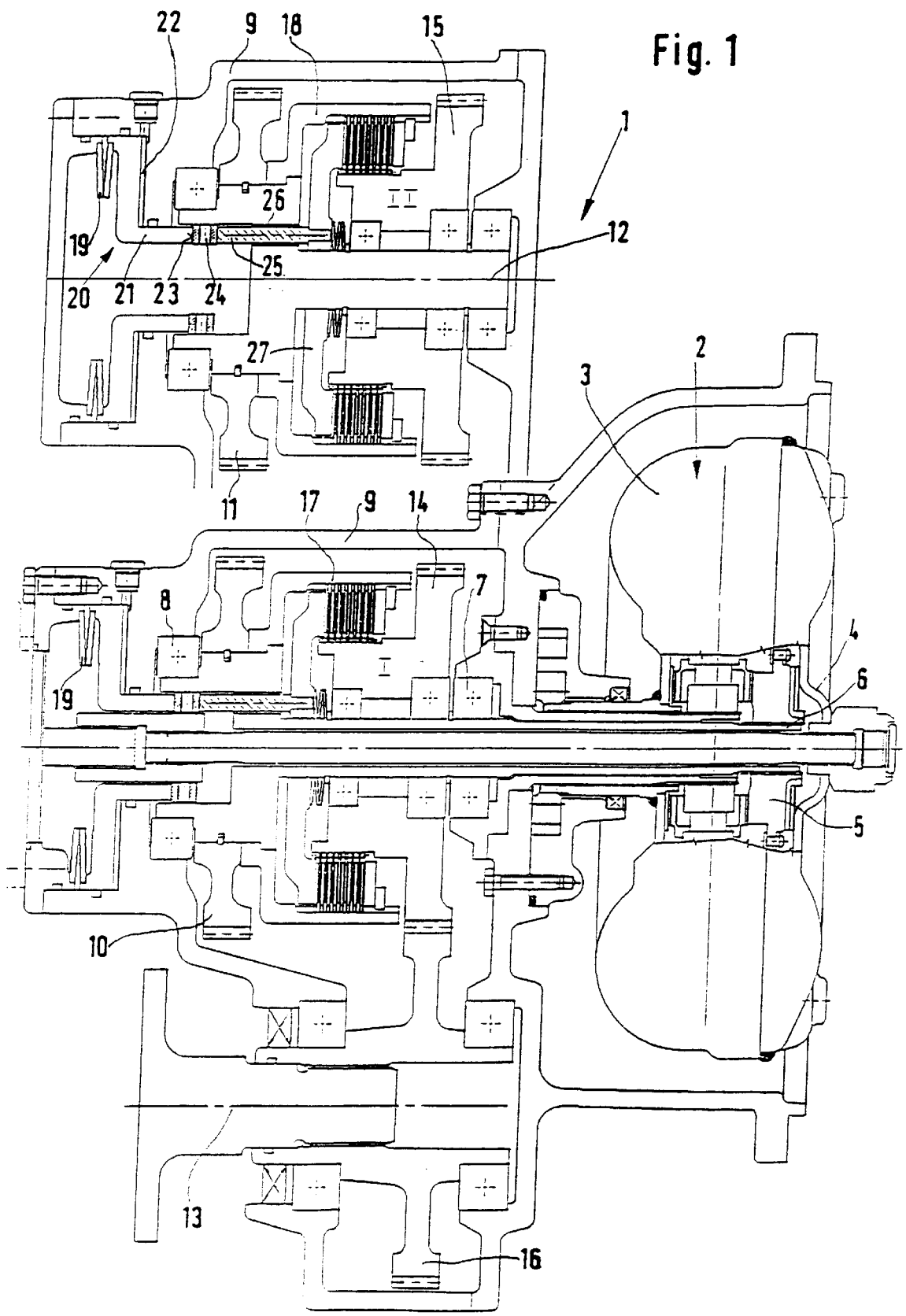

FIG. 1 is a powershift reversing transmission 1 shown in longitudinal section. It is a reversing transmission having a forward and a reverse gear, in particular, within a drive of a lift truck such as a loader. A hydrodynamic torque converter 2 is front mounted on the reversing transmission 1. An impeller 3, which is part of a converter housing 4, is in operative connection with a motor, not itself shown.

A turbine wheel 5, of the hydrodynamic torque converter 2, is non-rotatably connected with an input shaft 6 of the reversing transmission 1, designed as a hollow shaft.

The input shaft is rotatably mounted within a transmission housing 9 over two roller bearings 7 and 8. A fixed gearwheel 10—lying to the left in the drawing—is non-rotatably connected with the input shaft 6. The fixed gearwheel 10 is in permanent tooth meshing with another fixed gearwheel 11 of a countershaft 12. For the sake of a clearer general view, the countershaft 12 is shown in the plane of the drawing. The centers of the input shaft, of the countershaft 12 and of an output shaft 13 are at the vertices of a triangle, seen in a longitudinal direction of the transmission.

Idler gearwheels 14 and 15 are rotatably mounted upon the input shaft 6 and the countershaft 12. Said idler gearwheels 14 and 15 are in constant meshing with an output gearwheel 16 which is non-rotatably connected with the output shaft 13.

Clutches 17 and 18 are coordinated with the idler gearwheels 14 and 15. When the clutch 17 is engaged, the idler gearwheel 14 is non-rotatably connected with the input shaft 6. The clutch 17 serves to shift direction to the forward travel direction. The input power flows, via the engaged clutch 17, via the idler gearwheel 14, to the output gearwheel 16 and the output shaft 13.

For reversing the direction of travel, the clutch 18 (shift direction to the reverse travel direction) is engaged while the clutch 17 is disengaged. The input power flows, departing from the input shaft 6, via the fixed gearwheels 10 and 11, the engaged clutch 18 and, via the idler gearwheel 15, to the output gearwheel 16 and the output shaft 13.

The clutches are built in a typical manner per se so that a detailed description is unnecessary at this point.

The clutches 17 and 18 are reversing clutches of the reversing transmission 1. They are negatively actuated, that is, engaged by the force of plate springs 19 interacting in pairs and opened hydraulically. An actuating device 20 is coordinated with each clutch 17 and 18. Said actuating device is comprised of the following parts: a piston 21 axially movably and snugly passed into the transmission housing 9. The piston 21 forms, with the transmission housing 9, an annular chamber 22 to which pressurized medium can be fed or from which pressurized medium can be withdrawn. A front surface 23 of the piston 21 abuts against an axial bearing 24. Upon the opposite side of the axial bearing abut several bolts 25 of which one is reproduced and which are axially movably passed into bores 26 of the input shaft 6 and countershaft 12, respectively. The bolts 25 are firmly connected with a pressure plate 27 of the clutch 17 or 18. If the annular chamber 22 is pressureless, the clutches 17 and 18 are engaged by the tension of the plate springs 19, via the piston 21, the axial bearing 24 and the bolts 25. The clutches 17 and 18 are disengaged by feeding pressurized medium to the annular chamber 22. Depending on the level of the pressure of the pressurized medium prevalent in the annular chamber 22, the clutches 17 and 18 also can be more or less engaged or disengaged. In these cases, the clutches 17 and 18 slip.

Figure 2:
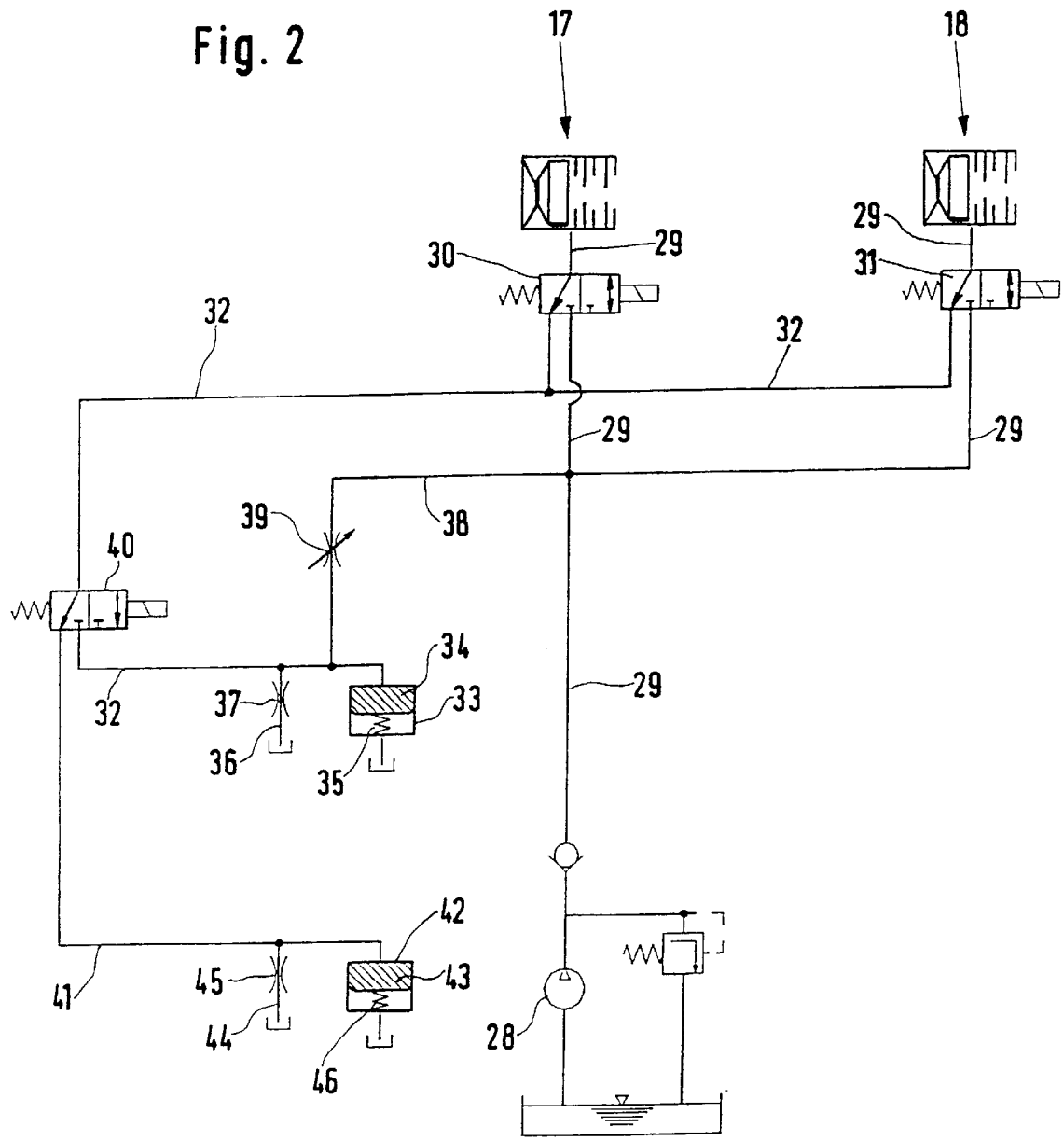

The diagram of a hydraulic circuit, for actuating the clutches 17 and 18, is to be understood from FIG. 2. A pump 28 conveys pressurized medium, via a branching feed pipe 29, to the annular chamber 22 of the clutch 17 or 18, provided that an electromagnetically switchable directional valve 30 (for the clutch 17) or 31 (for the clutch 18) is energized so that the section currently lying to the right is engaged. If this is not the case, the annular chamber 22 of the clutch 17 or 18 is connected with a return pipe 32. The return pipe 32 is attached to a reservoir 33. Into the reservoir 33 is movably passed a piston 34 loaded by a spring 35. A pipe 36, in which an aperture 37 is cut, is attached to the return pipe 32. It can be an advantage here to integrate the aperture 37 in the piston 34 so that aperture and piston form a combined component.

In addition, a connecting pipe 38 is attached, between the pipe 36 or the aperture 37 and the piston 34, by which a communication of the feed pipe 29 to the return pipe 32 is created. A throttle 39, of variable cross section, is in said connecting pipe 38.

In the instant embodiment of the invention, another directional valve 40 is in the return pipe 32. During the normal operation, said directional valve 40 is energized so that the section lying to the right in the drawing is engaged. In a currentless condition, for example, during a power failure, the directional valve 40 assumes the shift position reproduced in the drawing. In this case, the return pipe 32 is connected with another reservoir 42 by an additional pipe 41. Into said reservoir 42 is likewise movably passed a spring loaded (spring 46) piston 43. A pipe 44 leads from the pipe 41 to the tank. In said pipe 44 is cut another aperture 45. Here the aperture 45 can also be integrated in the piston 43 so as to form a combined component.

A forward direction of travel:

For the forward direction of travel, the clutch 17 is engaged while the clutch 18 is disengaged. As reproduced in FIG. 2, the directional valve 30 is engaged while the section of the directional valve 31 lying to the right is engaged. The directional valve 40 is energized so that a communication with the reservoir 33 exists via the return pipe 32.

A forward-reverse gearshift:

The directional valve 30 is energized while the directional valve 31 assumes the position reproduced in the drawing. The clutch 17 is hydraulically disengaged. The pressurized medium enclosed in the annular chamber 22 of the clutch 18, practically without delay, is conveyed almost completed (about 90%) via the return pipe 32 to the reservoir 33. During this operation, the piston 34 moves downward against the tension of the spring 35—referred to in the drawing. The clutch 18, at this moment, has already engaged to the extent that the clutch discs reciprocally abut. From this point on, the load taken up by the clutch 18 is pressure modulated. The controlled load is taken up by the clutch 18 until complete engagement thereof takes place, depending on the time, in a manner such that the pressurized medium conveyed from the annular chamber 22 to the reservoir 33 flows out into the tank via the aperture 37 and the pipe 36. The pressure level, during the explained pressure modulation, can be easily adapted or changed by an adequate design of the spring 35. The aperture sets the time interval during which the pressure modulation develops. No additional modulation valve is needed for the pressure modulation. The used aperture 37 is relatively independent of viscosity which, compared with seat valves, is of a special advantage.

During the reverse direction of travel, the clutch 17 is disengaged while the clutch 18 is engaged. Via the intermeshing fixed gearwheels 10 and 11, the power is conveyed from the input shaft 6 to the coupled idler gearwheel 15. The idler gearwheel 15 meshes with the output gearwheel 16 of the output shaft.

An inching operation:

In the assumed forward travel direction, the clutch 17 is engaged by the tension of the plate springs 19. For inching, a pressure must be built up in the annular chamber 22 in order that the clutch can slip, that is, the resulting tension acting upon the disc set is reduced. No separate inching valve is needed to build up said back pressure. The inching device consists of the throttle 39 of variable cross section. The cross section can be adjusted by an inching pedal, itself not shown. By actuating the inching pedal, an amount of oil from the feed pipe 29 is supplied, in measured quantities, to the return pipe 32 via the connecting pipe 38. Hereby it is, on one hand, possible to build up the required back pressure in the clutch 17 and, on the other, the pressurized medium can flow through the aperture 37 to the tank. The amount of pressurized medium, which does not instantaneously flow out is absorbed by the reservoir 34.

During the inching operation, the accelerator pedal can be easily actuated. This is needed, for example, when a load is to be lifted by the hydraulic system. "Creeping" can be engaged by the inching pedal.

A parking brake operation:

If both directional valves 30 and 31 are currentless, both clutch 17 and 18 are engaged so that the transmission is blocked. Accordingly, no additional parking brake is basically needed although optionally there can be one when needed for special reasons.

An emergency braking:

If the operating brake is not functioning, it must be possible to brake the vehicle with the parking brake. For this purpose, all directional valves 30, 31 and 40 are currentlessly switched. They assume the switching position reproduced in the drawing. The previously filled clutch 17 and 18 draw the pressurized medium, enclosed in the annular chamber 22, into the reservoir 42. By virtue of the spring 46, a back pressure appears in the annular chamber of the clutch so that a corresponding braking of the vehicle occurs. The pressurized medium, conveyed to the reservoir 42, now flows steadily out through the aperture 45. The aperture 45 is dimensioned so that the reservoir 42 does not empty until the vehicle is parked. Accordingly, the reservoir 42 may not be emptied as long as the vehicle moves.

The above explained braking operation, by a build up of a back pressure in the clutch, ensures that no inadmissibly high deceleration values occur. Since the clutches have been designed so as to be capable of transmitting the full starting torque, inadmissibly high deceleration values would be reached without said back pressure.

| Reference numerals | |
|---|---|
| 1 | reversing transmission |
| 2 | torque converter |
| 3 | impeller |
| 4 | converter housing |
| 5 | turbine wheel |
| 6 | input shaft |
| 7 | roller bearing |

-continued

| Reference numerals | |
|---|---|
| 8 | roller bearing |
| 9 | transmission housing |
| 10 | fixed gearwheel |
| 11 | fixed gearwheel |
| 12 | countershaft |
| 13 | output shaft |
| 14 | idler gearwheel |
| 15 | idler gearwheel |
| 16 | output gearwheel |
| 17 | clutch |
| 18 | clutch |
| 19 | plate spring |
| 20 | actuating device |
| 21 | piston |
| 22 | annular chamber |
| 23 | front surface |
| 24 | axial bearing |
| 25 | bolt |
| 26 | bore |
| 27 | pressure plate |
| 28 | pump |
| 29 | feed pipe |
| 30 | directional valve |
| 31 | directional valve |
| 32 | return pipe |
| 33 | reservoir |
| 34 | piston |
| 35 | spring |
| 36 | pipe |
| 37 | aperture |
| 38 | connecting pipe |
| 39 | throttle |
| 40 | directional valve |
| 41 | pipe |
| 42 | reservoir |
| 43 | piston |
| 44 | pipe |
| 45 | aperture |
| 46 | spring |

We claim:

1. A powershift reversing transmission (1) having one hydrodynamic torque converter (2), one input shaft (6), one countershaft (12), one output shaft (13), fixed and idler gear wheels (10, 11, 14, 15) which form a reversing set, said idler gear wheels can optimally be non-rotatably connected with one of said input shaft and countershaft and clutches (17, 18) which have actuating devices (20) for shifting direction, wherein each clutch (17, 18) is actuatable by spring tension when engaging and by hydraulic pressure against spring tension when disengaging, a directional valve (30 or 31) is provided for actuating each clutch (17 or 18) which, in a shifting position, connects an annular chamber (22) of each actuating device (20) with a feed pipe (29) and, in another shifting position, connects said annular chamber (22) with a reservoir (33), via a return pipe (32), from which a pressurized medium conveyed to said reservoir flows out through an aperture (37), and inserted in said return pipe (32), before said reservoir (33) and said aperture (37), which is a directional valve (40) during normal operation, maintains said return pipe continuously open and, in a pressureless state for starting a braking operation, connects said return pipe with another reservoir (42) from which the pressurized medium flows out through another aperture (45).

2. The reversing transmission according to claim 1, wherein said feed pipe (29) is attached to said return pipe (32) by a connecting pipe (38) in which a throttle (39), of variable cross section, is situated so that a back pressure applied against the tension of plate springs (19) engaging each clutch, can be built up in said annular chamber (22) of said each clutch (17 or 18).

3. The reversing transmission according to claim 2, wherein said throttle (39) is connected to and is adjustable by an inching pedal.

4. The reversing transmission according to claim 1, wherein said reservoir (33) has a volume substantially corresponding to a volume of oil removed form said annular chamber (22) until discs of said each clutch (17 or 8) which is connected with the return pipe (32) abut against one another.

* * * * *